United States Patent Office 3,382,084
Patented May 7, 1968

3,382,084
ASPHALT BINDER PITCH
Hillis O. Folkins, John W. Walsh, and Theodore R. Embach, Crystal Lake, Ill., assignors, by mesne assignments, to Union Oil Company of California, Los Angeles, Calif., a corporation of California
No Drawing. Filed Dec. 11, 1964, Ser. No. 417,769
14 Claims. (Cl. 106—284)

ABSTRACT OF THE DISCLOSURE

The invention comprises the use of an extract from green petroleum coke as an improved binder for carbon in the preparation of graphite electrodes and molded carbonaceous solids. The extract is used by incorporating the extract, preferably in an amount from about 2 to 20 percent by weight, in a petroleum pitch, and adding the resultant blend to carbonaceous solids which are then molded and, when necessary, graphitized. Use of a petroleum pitch containing the extract from green petroleum coke results in production of graphite electrodes having a higher density, lower resistivity and lower coefficient of thermal expansion than achieved in the absence of the extract. The extract is obtained by treatment of the green petroleum coke with a solvent or aromatic compounds, preferably with a basic nitrogen-containing solvent.

Description of the invention

This invention relates to the combination of a petroleum pitch and a certain extract from green delayed coke to form a binder pitch having improved properties, such as increased petroleum resin content, suitable softening point and high carbon residue, to impart an unexpected wettability, adhesiveness and body for good molding qualities.

It is known in the art to use coal-tar pitch and pitch derived from petroleum residuals as binders for carbon and graphite electrodes and as mold stocks for other uses. Such pitches must possess certain critical characteristics such as a suitable softening point, a high carbon residue and a high and suitably distributed resin content. The high carbon residue contributes to the composition because a large percentage of the pitch is converted into carbon during the baking of the electrode. The resin content and its distribution imparts suitable wettability, adhesiveness and body which are necessary for good molding qualities. Other attributes spring from these critical characteristics, such as proper mold release properties and freedom from cracks.

In accordance with this invention the discovery has been made that, although pitches derived from petroleum residuals are generally inferior to coal-tar pitches, having as they do low resin contents when the precursor residuals are processed to give pitches of suitable carbon residue contents and softening point, these drawbacks can be overcome by the addition of about 2 to 20% by weight of material extracted from green delayed coke using solvents of the character of pyridine, quinoline, nitrobenzene, anthracene oil and the like. In another aspect of this invention the extract from the green delayed coke can be added to the residual before same is thermally decomposed to form the pitch.

A primary object of this invention is to provide an improved carbon or graphite binder pitch of petroleum origin.

Another object of this invention is to provide a method of preparing improved carbon or graphite binder pitch of petroleum origin.

Another object of this invention is to provide an improved carbon or graphite binder pitch containing a material extracted from green delayed coke by the solvent action of solvents of the character of pyridine, quinoline, nitrobenzene and anthracene oil, and the like.

A further object of this invention is to provide such an improved carbon or graphite binder pitch containing about 2 to 20% by weight of extract from green delayed coke.

These and other objects of this invention will become apparent or be described as the specification proceeds.

The present invention is based on the discovery that the solvent extract prepared by treating the green delayed coke in the coking drum, after light hydrocarbons are steam-stripped therefrom, with a selective solvent, contains as the extracted portion thereof valuable materials for blending with petroleum thermal tar to produce an improved binder pitch for carbon and graphite bodies. Although it is not known just what the extracted materials do to enhance the properties of the end product or why they perform in this manner, the invention is not to be restricted for want of a chemical explanation or theory since the fact remains that the mechanism of delayed coking is not thoroughly understood. Accordingly, the individual ingredients and starting materials to prepare same will be described in accordance with the processes by which they are formed, it being understood that the ingredients are not to be limited to those prepared by the illustration.

The delayed coke

This product is obtained in the following manner. As examples, a crude petroleum oil is fractionated to drive off gasoline, virgin naphtha, and kerosene, producing about 40 percent reduced crude. West Texas crude, containing variable amounts of sulfur compounds, is similarly treated to yield a 30 percent reduced crude. The two reduced crudes are combined and fed to a feed accumulator, where temperatures of about 550° F. obtain. From the feed accumulator, the mixture of hot reduced crudes passes to a partial vaporizer coil where temperatures of about 750° F. are maintained. The purpose of this heating step is to drive out additional gas oil which is allowed to vaporize in a fractionating tower. The bottoms from this tower, at about 730° F., are called coking coil charge and comprise a mixture of straight run asphalt plus heavy partially cracked recycle stock. These bottoms are passed through a coking coil wherein short residence time and high velocities are maintained to vaporize 60 to 70 percent of the bottoms under conditions of low pressure drop to avoid the accumulation of carbon therein and insure early vaporization. The exit temperature from the coking coil will be about 915° F. with a pressure of about 30 p.s.i.g. The vaporized bottoms then pass immediately to the coking drums, which are usually operated alternately in pairs. Within the coking drum, the asphaltic hydrocarbon gradually coke and the light products vaporize off. The coke drum product from the top of the coking drum is recycled back to the fractionating tower. This coke drum product contains cracked gases, gasoline, light distillate, heavy distillate, and heavy recycle. After a certain time cycle, the coke drum becomes filled with coke and is ready for depressing. This step is carefully conducted to prevent carry-over of coke with the light oils which are released thereby and collected as blow down oil. Steam is then introduced into the bottom of the coking drum and the remaining materials in the coke are distilled out. The steam condensate from the steam treatment is conducted to suitable containers where it can cool. During the cooling operation, considerable water separates leaving so-called "wax tailings." The material in the full coke drum, so-treated to strip light hydrocarbons and cooled by water injection, constitutes the green delayed coke from which the extract used in accordance with this invention is obtained.

The mechanism of the delayed coking reaction has been a matter of speculation. As the coking coil charge enters the coke drum, due to its high latent heat content, a succession of dehydrogenations and splitting off of light hydrocarbons from the coking coil charge begins. The mass that is left by this process is not all elemental carbon but a mixture of carbon and certain hydrocarbons of very high molecular weight and having a high carbon-to-hydrogen ratio. As the destructive distillation or coking reaction proceeds, the coking coil charge passes through the asphalt and pitch stage to finally decompose into a porous mass of coke. The depressuring step releases gradually any occluded hydrocarbons, as has been described.

The invention is not limited as to the petroleum source or the process conditions wherein the delayed coke is obtained. Generally coking temperatures of 875 to 950° F. and pressures of 5 to 50 p.s.i.g. are applicable to the delayed coke used in accordance with this invention. Residence time will vary as is known in the art according to operating conditions such as temperature. In delayed coking a primary concern is to maintain sufficient velocity of the charge to prevent coking in the furnace coils. Steam may be used as a diluent to prevent coking in the coils.

Extract of green delayed coke

The green delayed coke is treated with a selective solvent, using about 20 to 40 and preferably about 30 parts of solvent per part of coke, at a temperature of about 120° to 400° F., depending on the boiling points of the solvents, in a liquid phase extraction process. The solvent is either passed through the coke in heated condition in the drum one or more times, or the coke may be removed from the coking drum, broken up and mixed with the solvent in a separate vessel. The extract phase is separated and the solvent is distilled off, using conventional equipment, to recover the solvent extract material.

The solvent used is characterized by its affinity for aromatic materials, such as the solvent used in the solvent refining of mineral lubricating oils, except that the solvents are characterized by their additional affinity for petroleum resins and the high molecular weight materials present in the green delayed coke. Suitable solvents are basic nitrogen compounds with the nitrogen substitution in the ring or in an alkyl side chain. Examples are quinoline, pyridine, pyrrole and aniline. Other nitrogen containing aromatics such as those containing a nitro group may be employed, e.g. nitrobenzene. Highly condensed aromatics such as anthracene, phenanthrene, etc. in an aromatic solvent may also be used. Thus, anthracene oil from coal tar distillation is an effective solvent. Such solvents as phenol, phenol and water, sulfur dioxide and furfural are not suitable. Phenazine and acridine are unsuitable as solvents because they are solids.

Examples of basic nitrogen compounds with a nitrogen substituent in the ring are 2-aminoquinoline, 2-aminopyridine, 3-aminopyridine, 2-ethylpyridine, 2-isopropylpyridine, 4-isopropylpyridine, 4-methoxypyridine, 2-methylpyridine, 3-methylpyridine, 4-methylpyridine, 1-acetylpyrrole, 2,4-dimethylpyrrole, 2,5-dimethylpyrrole, 1-ethylpyrrole, 1-methylpyrrole, 2-methylpyrrole and 1-propylpyrrole. The basic ring structure has 4 to 9 cyclic carbon atoms and one cyclic nitrogen atom.

Examples of basic aromatic nitrogen compounds are those having 6 cyclic carbon atoms and amino groups attached to cyclic carbon atoms, such as aniline or those having the basic nitrogen constituent in one or more alkyl chains of 1 to 4 carbon atoms, such as 0-phenylenediamine, m-phenylenediamine, p-phenylenediamine, o-bromoaniline, m-bromoaniline, p-tertiarybutylaniline, o-chloroaniline, m-chloroaniline, 2,4-dichloroaniline, m-ethylaniline and p-ethylaniline. As illustrated 1 to 4 amino groups may be present in addition to $C_1$ to $C_4$ alkyl groups along with 1 to 2 halogen groups. The group of nitro-aromatic $C_6$ to $C_8$ compounds is illustrated by o-dinitrobenzene, nitro-ethylbenzene, p-dinitrobenzene and nitronaphthalene. Highly condensed aromatics such as anthracene and phenanthrene are used with any of the aforementioned liquid solvents or with benzene and naphthalene, or coal-tar fractions of aromatic character boiling in the range of 250° to 380° C., including the product known as anthracene oil (BR 270° to 360° C.) may also be used alone or with the aforementioned solvents.

The extraction step is carried out using either batch or continuous extraction methods and the recovered solvent may be reused in the process. Delayed coke suitable for extraction generally has a volatile combustible material (VCM) content of around 9–14 weight percent. While cokes with VCM contents within this range are equally suitable as raw material for extraction, cokes with higher VCM values offer an advantage in that more extract material is obtainable from a given amount of coke. Thus the invention includes the use of coke with unusually high VCM contents, as high as 25 to 30 percent. This latter material generally is available near the top of a coke drum.

Petroleum thermal tar and pitch therefrom

The residual material from which the pitch useful in accordance with this invention is obtained may be any residual, heavy tar or tar-like substituent obtained from either thermal or catalytic cracking of a wide variety of petroleum hydrocarbons. The tar used in accordance with this invention may be the bottoms from the thermal cracking of gas oils or the bottoms from the catalytic cracking of virgin gas oils or so-called catalytic recycle oil. This tar may also be a decant oil from catalytic cracking or tars obtained from high temperature thermal cracking of ethane, propane, butane, naphtha or higher materials in processes directed to the production of olefins as the primary products. Thus the tars obtained in the high temperature thermal cracking of ethane to produce ethylene may be used in accordance with this invention.

The general and specific properties of petroleum tar to be used in accordance with this invention are shown in Table I.

TABLE I

| Petroleum Thermal Tar | Specific | Range |
| --- | --- | --- |
| Viscosity, SUS at 210° F. | 43.1 | 20–1,200 |
| Conradson Carbon Residue, wt. percent | 7.7 | 2–30 |
| Gravity, ° API | 4.4 | 0–20 |
| Sulfur, wt. percent | 0.87 | [1] ~ 1.25 |
| C/H Ratio (atomic) | | [2] ~ 0.80 |
| Pour Point, ° F. | +5 | |
| Boiling Range, ° F.: | | |
| IBP | 465 | [2] 350 |
| Amt. Distilled at 1060° F., percent | 93 | 70–97 |

[1] Max. [2] Min.

The pitch useful in accordance with this invention is obtained from the foregoing tar by destructive distillation for a period of time and at a temperature sufficient to form a pitch having a softening point of about 160° F. to about 210° F., a carbon residue of at least about 35% to 45% and containing at least about 8 wt. percent to about 25 wt. percent and preferably about 20 wt. percent of benzene insolubles, at least about 2 wt. percent to about 7 wt. percent and preferably about 5 wt. percent quinoline insolubles and at least about 10% to 35% by weight of beta resins.

In order to demonstrate the invention, the following non-limiting examples are given:

EXAMPLE I

A petroleum thermal tar obtained by cracking a mixture of virgin gas oil and catalytic cycle stock and having the following characteristics:

TABLE II

| | |
| --- | --- |
| Softening point ° F. | +5 |
| Conradson carbon residue wt. percent | 7.7 |
| C/H ratio (atomic) | 0.90 | was destructively distilled over a period of 3 hours at a final oil temperature of 850° F. As a result of this distillation, a pitch was left in the described apparatus having the following properties:

TABLE III

| | |
|---|---|
| Softening point ° F | 195 |
| Conradson carbon residue wt. percent | 40 |
| Benzene insolubles do | 22 |
| Quinoline insolubles do | 7 |
| Beta resins do | 15 |

To this pitch was added (at 10 wt. percent of the total final mix) an extract obtained by the treatment of a delayed petroleum coke at 150° F. with hot pyridine using 30 parts by weight of pyridine to 1 part of coke. The delayed petroleum coke was obtained by coking of Mid-Continent and colorado residuals from atmospheric distillation. The extract so obtained had the following properties after distilling off the solvent from the extract solution:

TABLE IV

| | |
|---|---|
| Softening point ° F | >300 |
| Conradson carbon residue wt. percent | 75 |
| C/H ratio (atomic) | 1.6 |

The addition of the extract to the pitch was conducted by digesting the powdered extract material with the molten pitch at a temperaure considerably above the softening point of the pitch, preferably at a temperature of about 300 to 400° F. The resulting binder pitch so produced had the following properties:

TABLE V

| | |
|---|---|
| Softening point ° F | 205 |
| Conradson carbon residue wt. percent | 52 |
| Benzene insolubles do | 30 |
| Quinoline insolubles do | 10 |
| Beta resins do | 20 |

This pitch was used to prepare an electrode by mixing same with finely ground calcined petroleum carbon in a weight ratio of 31:100. The resultant mixture was extruded at 250° F. and 4000 p.s.i.g. pressure to produce a cylindrical green electrode composition one-half inch in diameter. The green electrodes thus produced were packed in a carbon-sand mix and slowly heated to 1750° F. over a period of 60 hours to drive off the volatile matter and at the same time to carbonize the binder. Graphite electrodes made by graphitizing these green electrodes at 4900° F., in a carbon-resistance furnace are free from flaws and had the following properties of high density, low electrical resistivity and low coefficient of thermal expansion (C.T.E.):

| | |
|---|---|
| Density, gms./cc. | 1.45 |
| Resistivity, ohm-cm $\times 10^{-5}$ | 110 |
| C.T.E. (80–225° F.) $\times 10^{-6}$ per ° C. | 1.0 |

EXAMPLE II

Graphite electrodes, made by the same procedure as outlined in Example I, but using in their preparation the untreated petroleum pitch whose properties are listed in Table III, have the following characteristics:

| | |
|---|---|
| Density, gms./cc. | 1.38 |
| Resistivity, ohm-cm $\times 10^{-5}$ | 180 |
| C.T.E. (80–225° F.) $\times 10^{-6}$ per ° C. | 1.5 |

Electrodes made with this untreated pitch are characterized by high relative porosity and are inferior in both flexural and compressive strength. A comparison of the unsuitable electrode of Example II with the denser, more uniform electrode produced by the method of this invention in Example I, demonstrates the improved and unexpected wettability of the new binder pitch for carbon particles.

The extract obtained by treating the green delayed coke is subject to some variation in accordance with the extraction conditions and coke source. Although the amount of said extract may vary, the kinds of petroleum resins and high molecular weight complex aromatic hydrocarbons obtained do not vary. These materials will in general have softening points of about 300° F. to 500° F., exhibit Conradson carbon residues in order of 65 to 85 wt. percent and have C/H ratios (atomic) of about 1.4/1 to 1.7/1. Solvent to green coke ratios of 2/1 to 60/1 can be used although the preferred ratios for best results are 20/1 to 40/1.

Referring to Table V, which sets forth the specific properties of a finished binder pitch used to demonstrate this invention, it is seen that there has been an increase in carbon residue and those insoluble resinous materials which contribute to the desired properties of the finished electrode. Good results are obtained if the finished binder pitch has a softening point of about 180° to about 250° F., a carbon residue (Conradson) of about 50 wt. percent to about 60 wt. percent, contains about 25 wt. percent to 37 wt. percent of benzene insolubles and about 7 wt. percent to about 15 wt. percent of quinoline insolubles. The process of this invention and the binder pitches used in accordance therewith can be used to prepare electrodes of various sizes. As is known in this art, the formation of small electrodes in the order of half-inch to one-inch in diameter, results in inherently lower densities than is obtained when larger electrodes are made on a commercial basis. The binder pitch of this invention can be used to fabricate commercial graphite electrodes having electrical resistivities in the range of about 60 to about $150 \times 10^{-5}$ ohm-cm. and longitudinal coefficients of thermal expansion in the range of about 0.5 to $1.5 \times 10^{-6}/$° C. without regard to the density, which will be inherently higher.

This invention is thus seen to encompass a composition of matter comprising a mixture of a petroleum pitch and petroleum resins obtained from green delayed coke and also to a binder pitch wherein the composition contains a major portion of the petroleum pitch and a minor amount of petroleum resins extracted from green delayed coke. A binder pitch particularly adapted to form carbon and graphite electrodes is formed when at least about 2% to about 20% by weight of the petroleum resins and high molecular weight aromatic extract is used. Another aspect of this invention is the method of making the binder pitch by extraction of the soluble materials from green coke and incorporating the extract (free of solvent) into the pitch or into the pitch charge stock. The compositions can be prepared by adding the solvent extract from the green delayed coke, along with the solvent, to the residual hydrocarbons before destructive distillation; however, this results in some solvent loss, though intimate mixing is thereby attained.

The petroleum resins used in accordance with this invention cannot be obtained from the green delayed coke in a form useful for purposes of this invention by distillation and other means, such as solvent extraction, must be used. The amount of such extracted petroleum resins blended with the petroleum pitch may vary between about 2% by weight to 20% by weight. The use of more or less of the petroleum resins may be used but in so doing full advantage of the physical and chemical changes imparted thereby to the composition are not attained. The main objective of the addition of the extracted petroleum resins to the petroleum pitch, in accordance with this invention, is to raise the softening point of the composition to a value at least 5° F. to 20° F. above the softening point of the petroleum pitch, to raise the Conradson carbon residue of the composition by at least 5% by weight to about 60% by weight. By using about 10% to 20% by weight of said extracted petroleum resins in the petroleum pitch, to form compositions of this invention, more resinous properties are imparted thereto at lower softening points. Compositions of higher softening point and less resinous properties are attained by using about 2% to less than 10% by weight of extracted petroleum resins.

The compositions of this invention may contain other ingredients to impart special properties thereto without departing from the spirit of this invention. Thus, 1% to about 2% or more of aromatic oil may be incorporated to add lubricity to the mixture of carbon and binder pitch during the process of extruding carbon electrodes.

The embodiments of the invention in which an exclusive property or privilege is claimed are defined as follows:

1. A composition of matter comprising a mixture of a petroleum pitch and petroleum resins obtained from green delayed coke by extraction of said green delayed coke with a solvent characterized by its iffinity for petroleum resins and high molecular weight aromatic compounds.

2. A binder pitch comprising a major portion of a petroleum pitch and a minor portion of petroleum resins obtained from green delayed coke by extraction of said green delayed coke with a solvent characterized by its affinity for petroleum resins and high molecular weight aromatic compounds in an amount sufficient to raise the softening point of the pitch about 5 degrees and to raise the Conradson carbon residue of the pitch about 5 percent by weight.

3. A binder pitch comprising a petroleum pitch and about 2% to about 20% by weight of petroleum resins obtained from green delayed coke by extraction of said green delayed coke with a solvent characterized by its affinity for petroleum resins and high molecular weight aromatic compounds.

4. A binder pitch in accordance with claim 3 in which the petroleum pitch has the following properties:

| Property: | Value |
|---|---|
| Softening point, °F. | 160–210 |
| Carbon residue (Conradson) wt. percent | 35–45 |
| Benzene insolubles, wt. percent | 8–25 |
| Quinoline insolubles, wt. percent | 2–7 |

5. A binder pitch in accordance with claim 4 in which said petroleum pitch has the following properties:

| Property: | Value |
|---|---|
| Softening point, °F. | 195 |
| Conradson carbon residue, wt. percent | 40 |
| Benzene insolubles, wt. percent | 22 |
| Quinoline insolubles, wt. percent | 7 |
| Beta resins, wt. percent | 15 |

6. A binder pitch in accordance with claim 3 in which said petroleum resinh have a softening point of about 300° F. to about 500° F., exhibit Conradson carbon residues of about 65% to about 85% by weight and have carbon/hydrogen atomic ratios of about 1.4/1 to 1.7/1.

7. A binder pitch in accordance with claim 3 having the following properties:

| Property: | Value |
|---|---|
| Softening point, °F. | 180–250 |
| Conradson C.R. wt. percent | 50–60 |
| Benzene insolubles, wt. percent | 25–37 |
| Quinoline insolubles, wt. percent | 7–15 |

8. An electrode produced by the method of heating, to a temperature of about 1500° to 5000° F., a mixture of particulate carbon and about 20% to 40% of a binder pitch consisting essentially of (1) a petroleum pitch having a softening point of about 195° F., a Conradson C.R. of about 40 wt. percent, contains about 22 wt. percent benzene insolubles, about 7 wt. percent quinoline insolubles and about (2) 15 wt. percent beta resins and about 2 to 20% by weight of an extract obtained by the treatment of a delayed petroleum coke with pyridine at about 150° F., said extract having a softening point of about 300° F., a Conradson C.R. of about 75 wt. percent and a C/H ratio (atomic) of about 1.6/1.

9. The method of preparing a binder pitch which comprises treating green delayed coke with a basic nitrogen compound solvent selective for petroleum resins and high molecular weight aromatic hydrocarbons; separating the extract of petroleum resins and high molecular weight aromatic hydrocarbons from said solvent; adding about 2% to 20% by weight of said extract to a petroleum pitch, resulting from the destructive distillation of a petroleum tar, and digesting said mixture at a temperature above the softening point of said pitch.

10. The method in accordance with claim 9 in which said solvent is a basic nitrogen compound of aromatic nature having 4 to 9 cyclic carbon atoms and one cyclic nitrogen atom.

11. The method in accordance with claim 9 in which said solvent is a basic aromatic nitrogen compound having 1 to 4 amino groups attached to cyclic carbon atoms.

12. The method in accordance with claim 9 in which said solvent is a basic aromatic nitrogen compound having 1 to 4 amino groups attached through alkylene chains of 1 to 4 carbon atoms to $C_6$ to $C_{10}$ aromatic nuclei.

13. The method of claim 9 wherein said petroleum tar has the following properties:

| Property: | Value |
|---|---|
| Viscosity, SSU at 210° F. | 20–1200 |
| Conradson C.R., wt. percent | 2–30 |
| Gravity, °API | 0–20 |
| Sulfur, wt. percent max | 1.25 |
| C/H ratio (atomic) min | 1.80 |
| Boiling range, °F. (90 percent) | 450–1500 |

14. The method of claim 9 wherein said petroleum tar has a softening point of about +5° F., a Conradson C.R. of about 7.7 weight percent and a C/H ratio (atomic) of about 0.90.

References Cited

UNITED STATES PATENTS

| 2,502,183 | 3/1950 | Swallen | 264—105 X |
| 2,772,219 | 11/1956 | Dunkel et al. | 252—510 X |
| 2,838,386 | 6/1958 | Mason | 44—24 |
| 3,035,308 | 5/1962 | Rogoss et al. | 264—105 X |
| 3,124,471 | 3/1964 | Spetzler et al. | 106—281 X |
| 3,284,334 | 11/1966 | Metrailer et al. | 204—294 |
| 3,288,701 | 11/1966 | Fauber et al. | 208–45 |

FOREIGN PATENTS 664,517   6/1963   Canada.

OTHER REFERENCES

Guthrie: Petroleum Products Handbook, N.Y., McGraw-Hill Book Co. Inc., 1960, TP 690 G93 C. 3 (pages 14–1 to 14–13).

ALEXANDER H. BRODMERKEL, *Primary Examiner.*

J. B. EVANS, *Assistant Examiner.*